(12) United States Patent
Yanakiev et al.

(10) Patent No.: US 9,933,069 B2
(45) Date of Patent: Apr. 3, 2018

(54) DYNAMIC COMPENSATION FOR CLUTCH CONTROL DURING SHIFT

(71) Applicant: Ford Global Technologies, LLC, Dearborn, MI (US)

(72) Inventors: Diana Yanakiev, Birmingham, MI (US); Gregory Michael Pietron, Canton, MI (US); Jason Meyer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/689,165

(22) Filed: Apr. 17, 2015

(65) Prior Publication Data

US 2015/0219212 A1   Aug. 6, 2015

Related U.S. Application Data (63) Continuation-in-part of application No. 13/873,423, filed on Apr. 30, 2013, now Pat. No. 9,512,889.

(51) Int. Cl.
*F16H 61/06*   (2006.01)
*F16D 48/06*   (2006.01)

(52) U.S. Cl.
CPC .......... *F16H 61/061* (2013.01); *F16D 48/06* (2013.01); *F16D 2500/3024* (2013.01); *F16D 2500/30421* (2013.01); *F16D 2500/3166* (2013.01); *F16D 2500/3168* (2013.01); *F16D 2500/525* (2013.01); *F16D 2500/7044* (2013.01);

(Continued)

(58) Field of Classification Search
CPC .. F16H 61/061; F16H 2061/062; F16D 48/06; F16D 2500/525; F16D 2500/70605; F16D 2500/30421; F16D 2500/3166; F16D 2500/3024; F16D 2500/3168; F16D 2500/7044; F16D 2500/7082
See application file for complete search history.

(56) References Cited

U.S. PATENT DOCUMENTS

| | | |
|---|---|---|
| 4,790,418 A | 12/1988 | Brown et al. |
| 5,115,698 A | 5/1992 | Leising et al. |
| 5,646,842 A | 7/1997 | Schulz et al. |

(Continued)

FOREIGN PATENT DOCUMENTS

| | | |
|---|---|---|
| EP | 1712767 A1 | 10/2006 |
| WO | 2014164408 A1 | 10/2014 |

*Primary Examiner* — Jerrah Edwards
*Assistant Examiner* — Majdi Alsomiri
(74) *Attorney, Agent, or Firm* — James Dottavio; Brooks Kushman P.C.

(57) ABSTRACT

When a transmission controller issues a control command, such as pressure to control clutch torque, the response may be delayed due to dynamic properties of the control system. These properties can be modeled using a dynamic response model. One potential model is a combination of a pure time delay and a first order distributed delay. Control methods may be improved in several ways by accounting for the dynamic response. First, the dynamic response model may be used to improve adaptation of a transfer function between the commanded control signal and the clutch torque. Second, the command may be adjusted based on the dynamic response model. Both the pure time delay and the time constant of the first order distributed delay may be functions of operating conditions such as temperature.

13 Claims, 5 Drawing Sheets

(52) U.S. Cl.
CPC ............... *F16D 2500/7082* (2013.01); *F16D 2500/70605* (2013.01); *F16H 2061/062* (2013.01)

(56) References Cited

U.S. PATENT DOCUMENTS

| | | | |
|---|---|---|---|
| 5,758,302 A | 5/1998 | Schulz et al. | |
| 5,919,244 A | 7/1999 | Danz et al. | |
| 6,115,661 A | 9/2000 | Hosseini et al. | |
| 6,149,547 A | 11/2000 | Oba et al. | |
| 6,259,986 B1 | 7/2001 | Kotwicki | |
| 6,385,520 B1* | 5/2002 | Jain .................. | F16H 61/061 701/51 |
| 6,415,213 B1* | 7/2002 | Hubbard ............ | F16H 61/0437 701/51 |
| 6,514,173 B2 | 2/2003 | Suzuki | |
| 6,676,561 B2 | 1/2004 | Fritzer et al. | |
| 6,770,010 B2 | 8/2004 | Matsumura et al. | |
| 6,902,511 B2 | 6/2005 | Shimizu et al. | |
| 6,923,049 B2 | 8/2005 | Fujii et al. | |
| 7,010,405 B2 | 3/2006 | Furuichi et al. | |
| 7,160,225 B2 | 1/2007 | Berger et al. | |
| 7,212,935 B1 | 5/2007 | O'Brien et al. | |
| 7,287,443 B2 | 10/2007 | Kuhstrebe et al. | |
| 7,527,578 B2 | 5/2009 | Soliman et al. | |
| 7,693,635 B2 | 4/2010 | Rains | |
| 8,083,041 B2 | 12/2011 | Capita et al. | |
| 8,155,850 B2 | 4/2012 | Greenwood-Smith | |
| 8,255,130 B2 | 8/2012 | Fujii et al. | |
| 8,308,608 B2 | 11/2012 | Wilke et al. | |
| 8,510,003 B2 | 8/2013 | Yanakiev et al. | |
| 8,585,551 B2 | 11/2013 | Choby | |
| 8,843,289 B2 | 9/2014 | Postic et al. | |
| 8,965,652 B2 | 2/2015 | Moorman et al. | |
| 9,022,165 B2 | 5/2015 | Sah et al. | |
| 9,074,645 B2 | 7/2015 | Hosokawa et al. | |
| 2002/0137595 A1 | 9/2002 | Markyvech et al. | |
| 2009/0105039 A1 | 4/2009 | Sah et al. | |
| 2009/0118930 A1 | 5/2009 | Heap et al. | |
| 2010/0318269 A1 | 12/2010 | Yanakiev et al. | |
| 2011/0054747 A1 | 3/2011 | Dohi et al. | |
| 2011/0224855 A1 | 9/2011 | Schneider et al. | |
| 2012/0316738 A1 | 12/2012 | Teslak et al. | |
| 2013/0153353 A1* | 6/2013 | Teslak ................ | B60W 10/02 192/3.54 |
| 2014/0324308 A1 | 10/2014 | Pietron et al. | |

\* cited by examiner

DYNAMIC COMPENSATION FOR CLUTCH CONTROL DURING SHIFT

CROSS-REFERENCE TO RELATED APPLICATIONS

This application is a continuation-in-part of U.S. application Ser. No. 13/873,423 filed Apr. 30, 2013, now U.S. Pat. No. 9,512,889 issued Dec. 6, 2016, the disclosure of which is hereby incorporated in its entirety by reference herein.

TECHNICAL FIELD

This invention relates generally to a method for controlling a transmission clutch during a clutch control event. More particularly, the invention relates to compensation for dynamic behavior of the transmission and control system.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. Transmission speed ratio is the ratio of input shaft speed to output shaft speed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

A common type of automatic transmission includes a gearbox capable of alternately establishing a fixed number of power flow paths, each associated with a fixed speed ratio. The gearbox includes a number of shift elements such as clutches and brakes. A particular power flow path is established by engaging a particular subset of the shift elements. To shift from one power flow path to another power flow path with a different speed ratio, one or more shift elements must be released while one or more other shift elements must be engaged. Some shift elements are passive devices such as one way clutches, while other shift elements engage or disengage in response to commands from a controller. For example, in many automatic transmissions, the shift devices are hydraulically controlled friction clutches or brakes. The controller regulates the torque capacity of the shift element by regulating an electrical current to a solenoid, which adjusts a force on a valve which, in turn, adjusts a pressure in a hydraulic circuit.

A modern automatic transmission is controlled by a microprocessor which adjusts the torque capacity of each shift element, including any lock-up clutch, at regular intervals. At each interval, the controller gathers information indicating the driver's intent, such as the positions of the shifter (PRNDL), the accelerator pedal, and the brake pedal. The controller also gathers information about the current operating state of the vehicle, such as speed, and of the engine. Increasingly, information is also available from other sources, such as anti-lock brake controllers and GPS systems. Using this information, the controller determines whether to maintain the currently established power flow path or to shift to a different power flow path. If the controller decides to shift to a different power flow path, the controller then adjusts the torque capacities of the off-going shift elements and the on-coming shift elements in a coordinated manner in order to make the transition as smooth as possible.

SUMMARY OF THE DISCLOSURE

A transmission includes a clutch and a controller programmed to command a control signal, estimate an actual control signal based on a time profile of the commanded control signal and a dynamic response model, estimate an actual clutch torque, and update a static transfer function based on the estimated actual control signal and the estimated actual clutch torque. The control signal may be, for example, a pressure which regulates the clutch torque capacity. The dynamic response model may include one or both of a pure time delay and a first order distributed delay with a time constant. The pure time delay and time constant may vary based on operating conditions such as temperature. The dynamic response model may also be used to calculate the commanded control signal. For example, a lead-lag filter may be applied to a desired control signal profile to at least partially compensate for the first order distributed delay. In some circumstances, the controller may forecast the desired control signal into the future permitting compensation for the pure time delay.

A method of controlling a transmission during an event includes generating a commanded control signal profile based on a desired control signal profile and a dynamic response model, and issuing commands to control the clutch based on the commanded control signal profile. Generating the commanded control signal profile may include applying a lead-lag filter to the desired control signal profile. Generating the commanded control signal profile may also include forecasting the desired control signal profile to compensate for a pure time delay.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Controlling a hydraulically actuated automatic transmission requires manipulating a number of pressure commands to achieve a desired result. The desired result may be, for example, an upshift or downshift with particular torque and speed characteristics as a function of time. For an upshift, for example, the desired result may be a torque transfer phase that takes a specified amount of time, followed by a specified speed ratio vs. time profile during the inertia phase. In open loop control, the controller uses a model of the transmission to calculate what pressure commands will produce the desired result and then commands those pressure values. The model may be an empirical model based on testing a representative transmission or may be derived from physical laws and nominal transmission characteristics such as dimension. However, the actual behavior of the transmission may differ from the model for several reasons. First, there are part to part variations among transmissions of the same design. Second, a particular transmission varies over time due to gradual wear or unusual events. Third, the transmission responds to a large number of environmental factors such as temperature, atmospheric pressure, etc.

To improve control in the presence of these variations, called noise factors, a controller may utilize closed loop control. Closed loop control improves the result within a particular event, such as a shift. In closed loop control, the controller measures the property that defines the desired behavior, such as speed ratio. The difference between the measured value and a target value is called the error. The commanded pressure is set to the open loop term plus one or more closed loop terms that are functions of the error. Widely used examples of such function include linear terms such as: a proportional term (p term), a derivative term (d term), and an integral term (i term). Each such linear closed loop term has a coefficient of proportionality. These coefficients are set during calibration such that, despite the presence of noise factors, the result converges rapidly toward the desired behavior with minimal oscillation. Non-linear feedback terms may be employed in order to account for changing operating conditions, or to compensate for known non-linearities in the control system.

Adaptive control improves the result over a number of events. After an event, the controller utilizes the measurements made during the event to revise the model. (Sometimes this is done implicitly rather than explicitly, such as by modifying the open loop terms.) As the model becomes more representative of the particular transmission and the present conditions, the open loop control of future events becomes better. This minimizes the error that the closed loop terms need to accommodate. Moreover, it improves robustness of the phases of the shift that lack feedback information (e.g., the torque-transfer phase).

Both closed loop control and adaptive control require measurement or estimation of the properties that define the desired behavior. Ideally, this would be accomplished by having a separate sensor for each property. Unfortunately, sensors add cost and weight to a design and introduce failure modes. Also, some parameters are difficult to measure because the sensor would need to be buried in an inaccessible location of the transmission. Consequently, in practice, the number and type of sensors is restricted. When there is no sensor for the property that defines the desired behavior, a model may be utilized to estimate the value based on the available measured properties. These models are subject to the same types of noise factors as the models used to compute the open loop terms. Furthermore, a model may include assumptions that make it valid only under certain operating conditions, such as when in 2nd gear. In order to estimate the property in all of the relevant operating conditions, the controller may need to use multiple models. In some operating conditions, more than one of the models may be valid, leading to possibly conflicting estimates. In such cases, the controller must determine which estimate to trust. The controller may use the trusted model to revise the other models in order to improve the estimate in operating conditions in which the trusted model is unusable.

Figure 1:
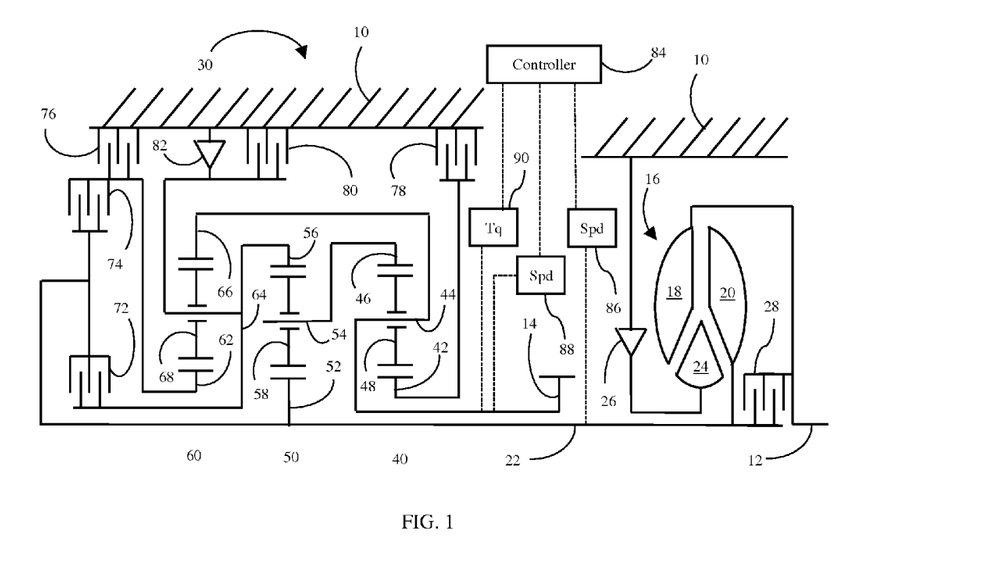
FIG. 1 is a schematic representation of a transmission.

FIG. 1 illustrates a representative front wheel drive automatic transmission. The transmission is contained in a housing 10 that is fixed to vehicle structure. An input shaft 12 is driven by the vehicle engine. The input shaft may be connected to the engine via a damper that isolates the transmission from engine torque pulsations. An output element 14 drives vehicle wheels. The output element 14 may be driveably connected to the wheels via final drive gearing and a differential. The final drive gearing transmits the power to a parallel axis and multiplies the torque by a fixed final drive ratio. The final drive gearing may include layshaft gears, a chain and sprockets, and/or planetary gearing. The differential divides the power between left and right front wheels while permitting slight speed differences as the vehicle turns. Some vehicles may include a power take-off unit that transfers power to rear wheels.

A torque converter 16 has an impeller 18 fixed to input shaft 12 and a turbine 20 fixed to turbine shaft 22. Torque converter 16 transmits torque from input shaft 12 to turbine shaft 22 while permitting turbine shaft 22 to rotate slower than input shaft 12. When turbine shaft 22 rotates substantially slower than input shaft 12, a torque converter stator 24 is held against rotation by one way clutch 26 such that the torque applied to turbine shaft 22 is a multiple of the torque supplied at input shaft 12. When the speed of turbine shaft 22 approaches the speed of input shaft 12, one way clutch 26 overruns. Torque converter 16 also includes a lock-up clutch 28 that selectively couples input shaft 12 to turbine shaft 22.

Gear box 30 establishes a number of speed ratios between turbine shaft 22 and output element 14. Specifically, gear box 30 has three planetary gear sets and five shift elements that establish six forward and one reverse speed ratio. Simple planetary gear sets 40, 50, and 60 each have a sun gear (42, 52, 62), a carrier (44, 54, 64), and a ring gear (46, 56, 66) that rotate about a common axis. Each planetary gear set also includes a number of planet gears (48, 58, 68) that rotate with respect to the carrier and mesh with both the sun gear and the ring gear. Carrier 44 is fixedly coupled to ring gear 66 and output element 14, carrier 54 is fixedly coupled to ring gear 46, ring gear 46 is fixedly coupled to carrier 64, and sun gear 52 is fixedly coupled to turbine shaft 22.

The various speed ratios are established by engaging various combinations of shift elements. A shift element that selectively holds a gear element against rotation may be called a brake whereas a shift element that selectively couples two rotating elements to one another may be called a clutch. Clutches 72 and 74 selectively couple turbine shaft 22 to carrier 64 and sun gear 62, respectively. Brakes 76 and 78 selectively hold sun gear 62 and sun gear 42, respectively, against rotation. Brake 80 selectively holds carrier 64 against rotation. Finally, one way clutch 82 passively holds carrier 64 against rotation in one direction while allowing rotation in the opposite direction. Table 1 illustrates which shift elements are engaged to establish each speed ratio.

TABLE 1

|  | 72 | 74 | 76 | 78 | 80/82 | Ratio | Step |
|---|---|---|---|---|---|---|---|
| Reverse |  | X |  |  | X | −3.00 | 71% |
| 1st |  |  |  | X | X | 4.20 |  |
| 2nd |  |  | X | X |  | 2.70 | 1.56 |
| 3rd |  | X |  | X |  | 1.80 | 1.50 |
| 4th | X |  |  | X |  | 1.40 | 1.29 |
| 5th | X | X |  |  |  | 1.00 | 1.40 |
| 6th | X |  | X |  |  | 0.75 | 1.33 |

Shift elements 72-80 may be hydraulically actuated multi-plate wet friction clutches or brakes. Controller 84 controls the pressure of transmission fluid routed to each shift element. This controller may adjust an electrical current to one or more variable force solenoids to control the pressure supplied to each clutch. When pressurized fluid is first supplied to a shift element, it moves a piston into a stroked position. Then, the piston forces plates together causing the shift element to transmit torque. The torque capacity is negligible until the piston reaches the stroked position. Once the piston reaches the stroked position, the torque capacity increases approximately linearly with the fluid pressure. When the pressure is relieved, a return spring moves the piston to a released (not stroked) position. The controller receives signals from a turbine speed sensor 86, an output speed sensor 88, and an output torque sensor 90. A typical upshift includes three phases: a preparatory phase, a torque transfer phase, and an inertia phase. During the preparatory phase, pressure is commanded to the on-coming shift element in order to stroke the piston so that it is ready for engagement. Also, the torque capacity of the off-going shift element may be reduced from a holding capacity well in excess of the transmitted torque to a value close to the actual transmitted torque. During the torque transfer phase, the torque capacity of the off-going shift element is gradually reduced and the torque capacity of the on-coming shift element is gradually increased. During this phase, there is little or no slip across the off-going shift element but considerable slip across the on-coming shift element. When the off-going shift element torque capacity reaches zero, the power flow path associated with the upshifted gear is established. Therefore, the torque ratio is equal to the upshifted torque ratio. However, the speed ratio is still equal or nearly equal to the original speed ratio. When the off-going shift element is completely released, the torque transfer phase ends and the inertia phase begins. During the inertia phase, the torque capacity of the on-coming shift element is controlled to eliminate the slip across the on-coming shift element and bring the speed ratio to the upshifted speed ratio in a controlled manner.

A power-on downshift also includes an inertia phase and a torque transfer phase, although they occur in the opposite order. During the inertia phase, the torque capacity of the off-going shift element is controlled to bring the speed ratio to the downshifted speed ratio in a controlled manner, which involves a progressively increasing slip across the off-going shift element. The on-coming shift element may be prepared for engagement by commanding pressure in order to stroke the piston. During the torque transfer phase, which occurs after the inertia phase, the torque capacity of the previously stroked on-coming shift element is gradually increased while the torque capacity of the off-going element is reduced to zero.

During the shift, accurate control of torque capacity is important in order to achieve a smooth shift. For example, during the torque transfer phase, the increase in torque capacity of the on-coming shift element must be carefully coordinated with the decrease in torque capacity of the off-going shift element. If the torque capacity of the on-coming shift element is ramped up too slowly, relative to the input torque and the rate of decrease of off-going shift element torque capacity, then an engine flare occurs. If, on the other hand, the on-coming shift element torque is ramped up too quickly, then a tie-up condition occurs. Both result in an excessive decrease in output torque.

Open loop control of shifts is aided by having a model for each shift element. The torque capacity of each clutch is adjusted by adjusting an electrical current to a solenoid in the valve body. A valve in the valve body responds by adjusting the pressure in a fluid circuit in proportion to the force generated by the solenoid. The fluid is routed to a clutch apply chamber where it pushes a piston to compress a clutch pack with interleaved friction plates and separator plates. A return spring forces the piston back when the pressure is relieved. In an exemplary steady state model of a hydraulically actuated friction clutch or brake, the torque capacity is a function of the electrical current supplied. This function generally has two segments. In a first segment, from zero current up to the current required to overcome the force of the return spring, the torque capacity is zero. Beyond the current required to overcome the return spring, the torque capacity increases linearly with respect to the current. In an alternative model, the fluid pressure is a function of the electrical current and the torque capacity is a function of the fluid pressure. This alternative model may be useful if a pressure sensor is available to provide a pressure feedback signal. In some models, other factors such as temperature may be considered. The shift element model is represented by a transfer function $$T_{cl} = F(U, X)$$

where $T_{cl}$ is the predicted clutch torque, U is the command signal, such as current or pressure, and X is a set of parameters indicating the environmental conditions, such as temperature.

Figure 2:
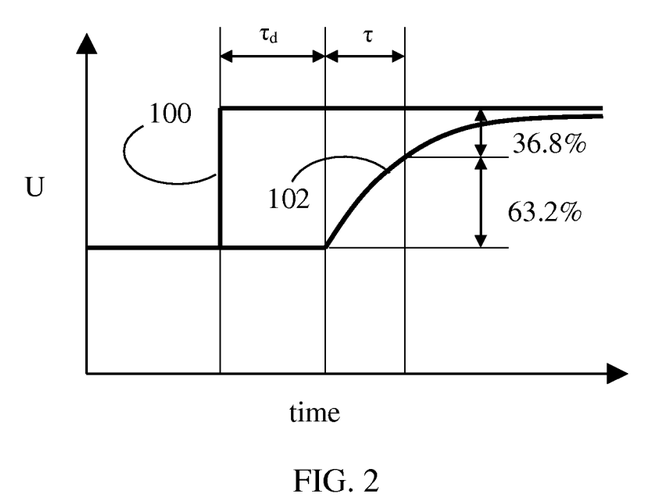
FIG. 2 is a graph illustrating the dynamic response of a shift element command signal.

In addition to consideration of the steady state relationship between clutch torque and a command signal, such as a pressure, the model may consider dynamic effects. FIG. 2 represents a possible model of the dynamic response of a control signal. In this example, the commanded control signal 100 changes from one level to another level in a step function. The actual control signal 102 does not immediately change to the second level. Instead, the actual control signal remains at the original level for a period of time called the pure delay $\tau_d$. Then, the actual control signal asymptotically approaches the second according to a first order distributed delay with a time constant of $\tau$. After a delay of $\tau$, the actual signal has changed 63.2% of the way to the second value. This dynamic response model may be represented by the dynamic transfer function $$G(s) = e^{-\tau_d s} \frac{1}{\tau s + 1}$$

Figure 3:
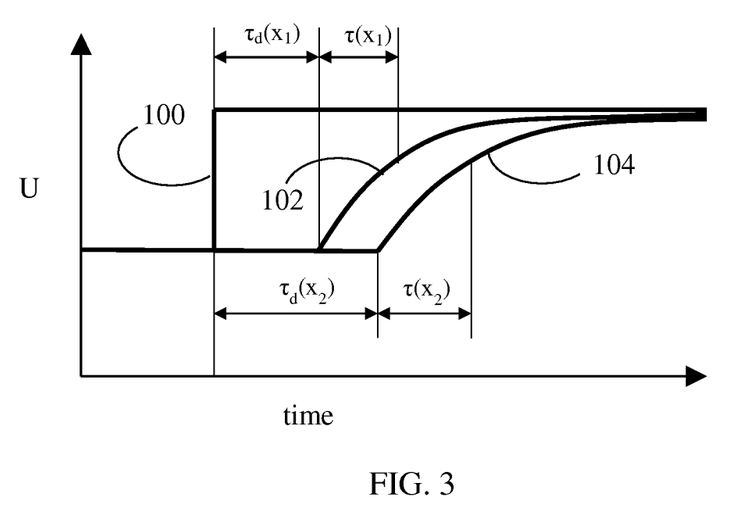
FIG. 3 is a graph illustrating how the dynamic response of a shift element command signal may vary based on environmental conditions.

As illustrated by FIG. 3, the dynamic response may vary depending upon environmental conditions such as temperature. For example, curve 102 represents the dynamic behavior in one environmental condition $X_1$ while curve 104 represents the dynamic behavior in a second environmental condition $X_2$. For example, $X_1$ may correspond to normal operating temperature and $X_2$ may correspond to a colder temperature. The impact of environmental conditions may be modeled by expressing the model parameters $\tau_d$ and $\tau$ as functions of a set of environmental condition parameters X.

Several of the models described above can be represented in controller 84 as one or more lookup tables. A lookup table stores predicted values of a model output variable for various combinations of values of one or more model input variables. When there is only one input variable, the lookup table is referred to as one dimensional. For example, a one dimensional lookup table may be used to represent the clutch transfer function model by storing values of clutch torque capacity at various commanded pressures. When the output variable is dependent upon multiple input variables, higher dimensional lookup tables are used. For example, a clutch transfer function may be represented as a two dimensional lookup table based on pressure and temperature.

To find a value for a model output variable based on particular values of the model input variables, the controller finds the stored points that are closest to the particular values and then interpolates. To find an input variable corresponding to a desired output variable, reverse interpolation is used. This reverse interpolation yields a unique solution only when the underlying function is monotonic. Alternatively, the model may be re-formulated such that clutch torque is an input variable and commanded pressure is an output variable.

Several methods are known for adaptively updating a model represented as a lookup function. These include both stochastic adaptation methods and periodic adaptation methods. Stochastic adaptation methods update the values in the lookup table in response to individual observed results. One such method is described in European Patent Application EP 1 712 767 A1, which is incorporated by reference herein. When the observed result differs from the value estimated by the lookup table, the stored values for nearby values of the model input variables are modified such that a new prediction for the same model input values is closer to the observed result. For stability, the adaptation is not allowed to change the stored values by too much at once. The adaptation may be restricted in various ways. For example, adaptation may only be allowed when the operating point is sufficiently close to one of the stored values. Also, there may be pre-defined bounds outside which adaptation is not performed. In a periodic adaptation method, multiple observations are stored and then a curve fitting process is performed to calculate new values for model parameters. As with stochastic adaptation methods, there may be restrictions on the rate of adaptation and there may be boundaries beyond which adaptation is not permitted.

Figure 4:
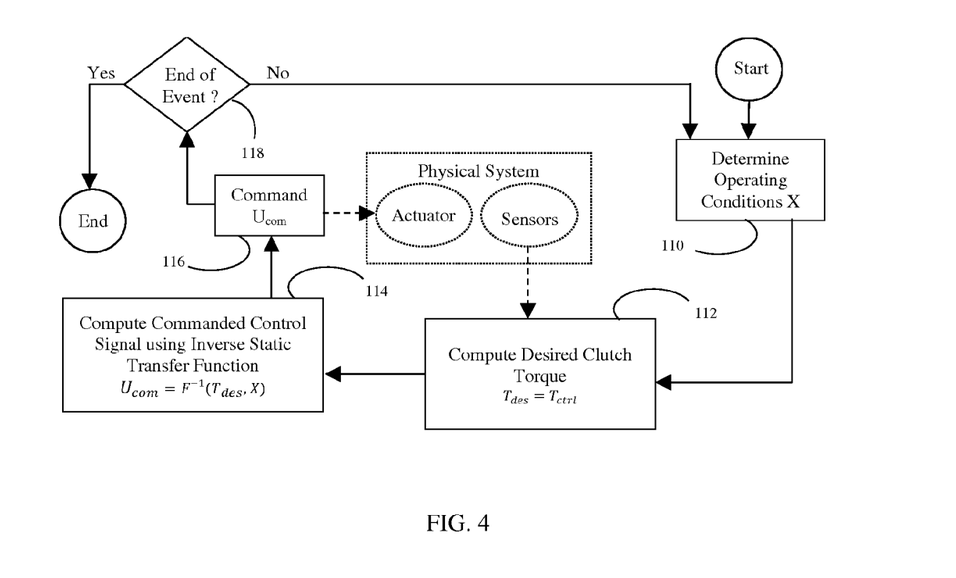
FIG. 4 is a flow chart for controlling a shift element.

FIG. 4 illustrates a clutch control algorithm that utilizes a static model of the clutch system for control. Solid lines indicate flow of control. Dotted lines indicate flow of information. At 110, the controller determines the operating conditions X. At 112, the controller determines the desired clutch torque $T_{des}$ which is equal to a function $T_{ctrl}$. $T_{ctrl}$ may be based on indicators of driver intention such as accelerator pedal position, on estimates or measurements of transmission input torque, and on measurements from the transmission system, such as the speeds of various elements. For example, during the inertia phase on an upshift, the information from speed sensors may be used to determine how quickly the shift is progressing. If the shift is progressing more slowly than desired, $T_{ctrl}$ may be increased. At 114, the commanded control signal $U_{com}$ is computed using an inverse of the shift element transfer function. At 116, the controller issues the computed control signal to the actuators. At 118, the controller determines if the shift event has completed and repeats the process if it has not.

The algorithm of FIG. 4 can be improved by adapting the static transfer function using a measured clutch torque. However, due to the dynamic response as illustrated in FIGS. 2 and 3, one would not expect the static transfer function to accurately relate the present command control signal to the present measured torque when the control signal is changing. The clutch control algorithm of FIG. 5 utilizes the dynamic transfer function to account for the dynamic response while adapting the transfer function. At 120, the controller estimates the actual effective control signal, $U_{act}$, using the dynamic transfer function and a recorded profile of past commanded control signals. At 122, the actual effective control signal is used with the static transfer function to predict the present clutch torque $T_{cl}$. At 124, the controller estimates the present clutch torque based on measurements. Methods for doing this are described in U.S. Pat. No. 8,510,003 and U.S. patent application Ser. No. 14/668,062 which are hereby incorporated by reference herein. These two clutch torque estimates are compared at 126 to compute an error term. At 128, the static transfer function is adapted to reduce the error. Since the transfer function is adapted only a small amount during each iteration, random noise in the measurements does not cause substantial adaptation. This adapted transfer function is used at step 114' to more accurately compute the control signal. Optionally, the desired clutch torque $T_{des}$ may include a function of the error at 112'.

Figure 5:
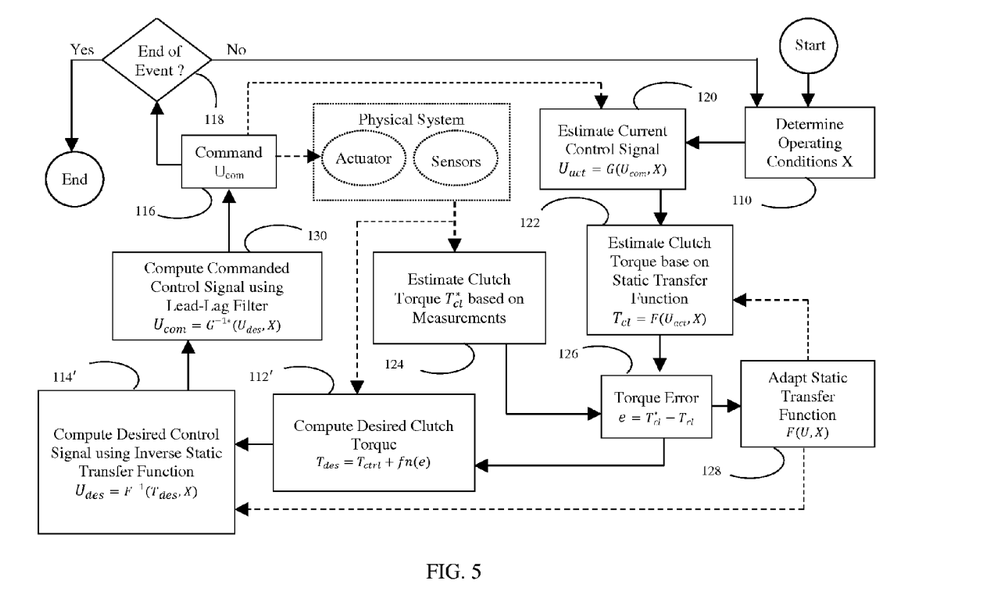
FIG. 5 is a flow chart for controlling a shift element and adapting a shift element transfer function while accounting for the dynamic response.

The algorithm of FIG. 5 also utilizes a dynamic model to compute the commanded control signal $U_{com}$. Instead of computing $U_{com}$ directly from $T_{des}$ in a single step as 114 of FIG. 4, the calculation is divided into two steps 114' and 130. At 114' the controller computes the desired control signal $U_{des}$ using the static transfer function. Then, at 130, the controller uses a lead-lag filter to at least partially compensate for the dynamics response. Ideally, the controller would use the inverse of the dynamic response function $G^{-1}(\ )$. However, the dynamic response function may not be invertible without information about future values of $U_{des}$. Consequently, it may be necessary to use a lead-lag filter with a transfer function $$G^{-1*}(s) = \frac{\tau_1 s + 1}{\tau_2 s + 1}$$

that approximates $G^{-1}$. The lead time constant $\tau_1$ may be selected equal to the first order time constant $\tau$. Alternatively, to also partially compensate for the pure time delay, $\tau_1$ may be selected equal to the sum of the first order time constant and the pure delay $\tau + \tau_D$. The lag time constant $\tau_2$ is selected such that $\tau_2$ is much smaller than $\tau_1$ but still large enough to prevent excessive sensitivity to small variations in $U_{des}$.

Figure 6:
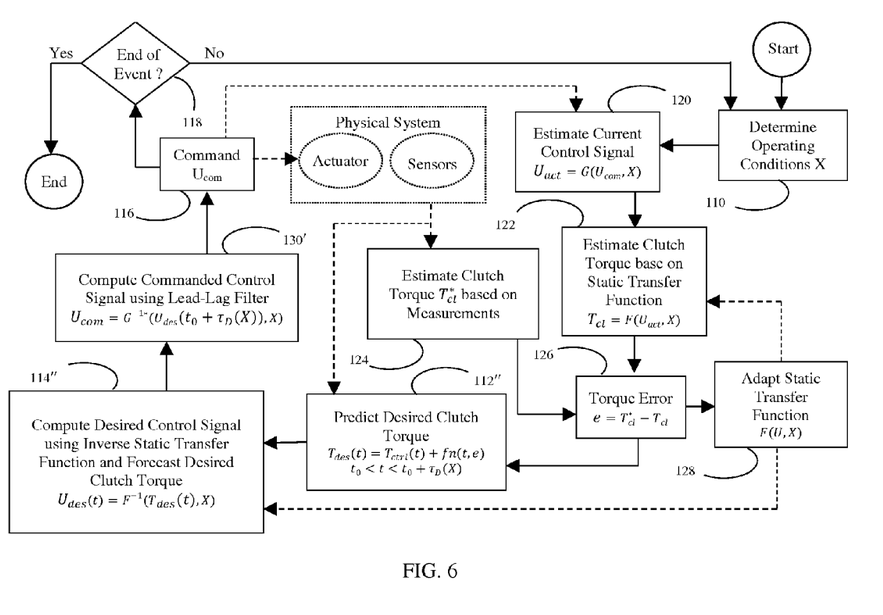
FIG. 6 is a flow chart for controlling a shift element and adapting a shift element transfer function when desired clutch torque can be forecast in advance.

FIG. 6 illustrates a further improvement upon the clutch control algorithm of FIG. 5. At 112", the controller predicts not only the present desired torque, but predicts the desired torque over a period of time extending into the future. This is possible because some of the terms used to compute the desired clutch torque are knowable or predictable in advance. For example, the nominal (feedforward) may be known if the desired ratio change is known for the next several update loops. Also, a feedback term based on an integral of the error may be predicted by assuming that the error continues at the present level. The controller may use the present value for other terms. Specifically, the desired torque is predicted for a period of time at least as long as the pure time delay $\tau_d$. Then, at 114'', the desired control signal is computed based on the static transfer function and the predicted desired clutch torque for the same time period. At 130', the commanded control signal is computed by applying the lead-lag filter to the predicted desired control signal $\tau_d$ in the future. Consequently, the control signal has time to take effect by the time that clutch torque is actually desired despite the delays due to the system dynamics.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
    a clutch; and
    a controller programmed to:
        command a pressure based on a target clutch torque and a static transfer function to control a torque capacity of the clutch;
        estimate an actual current pressure based on a first order distributed delay and a record of commanded pressures;
        estimate a torque transmitted by the clutch; and
        adapt the static transfer function based on the estimated transmitted torque and the estimated actual current pressure.

2. The transmission of claim 1 wherein the first order distributed delay has a time constant which is a function of a measured temperature.

3. The transmission of claim 1 wherein the controller is programmed to calculate the commanded pressure by calculating a desired pressure based on the static transfer function and applying a lead-lag filter to a desired pressure profile.

4. The transmission of claim 1 wherein the controller is further programmed to forecast the target clutch torque to create a target clutch torque profile and wherein the commanded pressure is based on a future target clutch torque.

5. A transmission comprising:
    a clutch; and
    a controller programmed to
        generate a target clutch torque profile,
        calculate a desired control signal profile based on a static transfer function and the target clutch torque profile,
        calculate a commanded control signal by applying a lead-lag filter to the desired control signal profile,
        issue the commanded control signal to the clutch,
        estimate a current control signal value based on a dynamic response model and the commanded control signal profile,
        estimate a current actual clutch torque, and
        adapt the static transfer function based on the estimated current actual clutch torque and the estimated current control signal value.

6. The transmission of claim 5 wherein the control signal is a pressure.

7. The transmission of claim 5 wherein the dynamic response model includes a pure time delay.

8. The transmission of claim 7 wherein the pure time delay is a function of a set of operating conditions.

9. The transmission of claim 8 wherein the set of operating conditions includes a temperature.

10. The transmission of claim 5 wherein the dynamic response model includes a first order distributed delay with a time constant.

11. The transmission of claim 10 wherein the time constant is a function of a set of operating conditions.

12. The transmission of claim 11 wherein the set of operating conditions includes a temperature.

13. The transmission of claim 5 wherein generating the target clutch torque includes forecasting the target clutch torque to create a target clutch torque profile and wherein the commanded control signal is based on a future target clutch torque.

\* \* \* \* \*